US009454409B2

(12) United States Patent
Laredo et al.

(10) Patent No.: US 9,454,409 B2
(45) Date of Patent: Sep. 27, 2016

(54) API MATCHMAKING USING FEATURE MODELS

(71) Applicant: International Business Machines Corporation, Armonk, NY (US)

(72) Inventors: Jim A. Laredo, Katonah, NY (US); Sriram K. Rajagopal, Chennai (IN); Maja Vukovic, New York, NY (US); John E. Wittern, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 14/487,437

(22) Filed: Sep. 16, 2014

(65) Prior Publication Data

US 2016/0077893 A1    Mar. 17, 2016

(51) Int. Cl.
*G06F 9/54* (2006.01)
*G06F 9/445* (2006.01)
*G06F 9/44* (2006.01)
*G06Q 10/06* (2012.01)

(52) U.S. Cl.
CPC . *G06F 9/54* (2013.01); *G06F 8/20* (2013.01); *G06F 8/36* (2013.01); *G06F 9/44505* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 6,831,635 B2 | 12/2004 | Boyd et al. | |
| 7,587,453 B2 | 9/2009 | Bhrara et al. | |
| 7,774,406 B2 | 8/2010 | Russo et al. | |
| 2004/0057390 A1 | 3/2004 | Boleyn et al. | |
| 2005/0165902 A1* | 7/2005 | Hellenthal | H04L 29/06 709/217 |
| 2009/0235285 A1* | 9/2009 | Kim et al. | 719/328 |
| 2009/0249369 A1* | 10/2009 | Itoh et al. | 719/328 |
| 2012/0266141 A1 | 10/2012 | Fanning et al. | |

FOREIGN PATENT DOCUMENTS

WO   2013071752 A1   5/2013

OTHER PUBLICATIONS

Appendix P—List of IBM Patents or Patent Applications Treated as Related.
U.S. Appl. No. 14/537,961 entitled "Profile-Driven Merging of API Components", filed Nov. 11, 2014.
Acher et al., "Composing Feature Models", Author manuscript, published in "2nd International Conference on Software Language Engineering (SLE'09), Denver: United States (2009)", hal-00415767, version 1—May 17, 2010.
Acher et al., "On Extracting Feature Models From Product Descriptions", VaMoS '12, Jan. 25-27, 2012 Leipzig, Germany, Copyright 2012 ACM 978-1-4503-1058-1.
Panziera et al., "Distributed Matchmaking and Ranking of Web APIs Exploiting Descriptions from Web Sources", 2011 IEEE International Conference on Service-Oriented Computing and Applications (SOCA), Dec. 12-14, 2011, Irvine, CA, pp. 1-8, DOI: 10.1109/SOCA.2011.6166201.

* cited by examiner

*Primary Examiner* — Umut Onat
(74) *Attorney, Agent, or Firm* — William H. Hartwell

(57) ABSTRACT

Software that uses machine logic based algorithms to help determine and/or prioritize an application programming interface's (API) desirability to a user based on how closely the API's terms of service (ToS) meet the users' ToS preferences. The software performs the following steps: (i) receiving a set of API ToS feature information that includes identifying information for at least one API and respectively associated ToS features for each identified API; (ii) receiving ToS preference information that relates to ToS related preferences for a user; and (iii) evaluating a strength of a match between each respective API identified in the API ToS feature information set and the ToS preference information to yield a match value for each API identified in the API ToS feature information set. The ToS features include at least a first ToS field. At least one API includes multiple, alternative values in its first ToS field.

20 Claims, 12 Drawing Sheets

Terms of Service - Create

Service: ☐
Type: ● Public  ○ Private

| Agreement | Payment |

▼ License

Is commercial usage of the service allowed?  ○ Yes  ○ No

Details: ☐

▹ Account
▹ Changes
▹ Compliance
▹ Third Party Requests
▹ Policies
▹ Liability
▹ Publicity

FIG. 6B

Payment | Agreement

Provide details about free quota: [____]

Billing Details: Mode: [--Select--] Frequency: [--Select--] Details: [____]

Late payment details: Interest Rate: [____] % per: [--Select--] Details: [____]

Taxes: Included? [--Select--] Tax %: [____] Details: [____]

How will disputes be handled? [____]

What are the refund policies? [____]

What are the pricing change policies? [____]

Terms of Service - Create

| Select | Service Name | Type |
|---|---|---|
| ☐ | BizRay | Public |
| ☐ | SSE | Public |

[Create New Terms of Service] [Compare] [View/Update Terms of Service]

600c

1200a

| API | API Functionality | ToS Pref. Match |
|---|---|---|
| A | Add two numbers | ? |
| B | Multiply two numbers | ? |
| C | Add two numbers | ? |

What API functionality do you want?

\>

What commerciality ToS feature do you want (commercial or non-commercial)?

\>

What geographic ToS feature do you want?

| API | API Functionality | ToS Pref. Match |
|---|---|---|
| A | Add two numbers | 100% |
| ~~B~~ | ~~Multiply two numbers~~ | ~~?~~ |
| C | Add two numbers | 50% |

What API functionality do you want?

\> Add two numbers

What commerciality ToS feature do you want (commercial or non-commercial)?

\> Commercial

What geographic ToS feature do you want?

\> North American us only

API MATCHMAKING USING FEATURE MODELS

BACKGROUND OF THE INVENTION

The present invention relates generally to the field of application programming interfaces (APIs), and more particularly to the field of API matchmaking.

APIs are known. Conventionally, an API is a set of rules and specifications that a software program can follow to access and make use of the services and resources provided by another software program that implements that API. An API serves as an interface between different software programs and facilitates their interaction. The API economy is a complex network of services built from APIs enabled by multiple providers, with each API having its own engagement model and objectives. APIs are typically governed by terms of service, which are rules that an API consumer must agree to abide by in order to purchase and/or use an API. When selecting APIs and their corresponding terms of service, API consumers have different objectives and/or criteria to consider in making their selection.

API matchmaking is known. Thousands of APIs are now readily available, with differing functionality and API features. In order to support API consumers in selecting the appropriate APIs, effective automated methods to match APIs with consumer requirements and/or preferences are required.

Feature models are known. A feature model is a compact representation of software "features." A feature is a prominent or distinctive user-visible aspect, quality, or characteristic of a software system. Feature models are visually represented by using feature diagrams. Feature models are used during the software development process and are commonly used to produce other assets such as documents, architecture definition, and/or pieces of code.

SUMMARY

According to an aspect of the present invention, there is a method, computer program product and/or system that performs the following steps (not necessarily in the following order): (i) receiving a set of application programming interface (API) terms-of-service (ToS) feature information that includes identifying information for at least one API and respectively associated ToS features for each identified API; (ii) receiving ToS preference information that relates to ToS related preferences for a user; and (iii) evaluating a strength of a match between each respective API identified in the API ToS feature information set and the ToS preference information to yield a match value for each API identified in the API ToS feature information set. The respective associated ToS features include at least a first ToS field. At least one API, of the set of API ToS feature information, includes multiple, alternative values in its respectively corresponding first ToS field.

BRIEF DESCRIPTION OF THE DRAWINGS

FIG. 6A is a screenshot view showing information that is generated by embodiments of the present invention;

FIG. 6B is a screenshot view showing information that is generated by embodiments of the present invention;

FIG. 6C is a screenshot view showing information that is generated by embodiments of the present invention;

FIG. 12A is a first screenshot view generated by the first embodiment system; and FIG. 12B is a second screenshot view generated by the first embodiment system.

DETAILED DESCRIPTION

Figure 1:
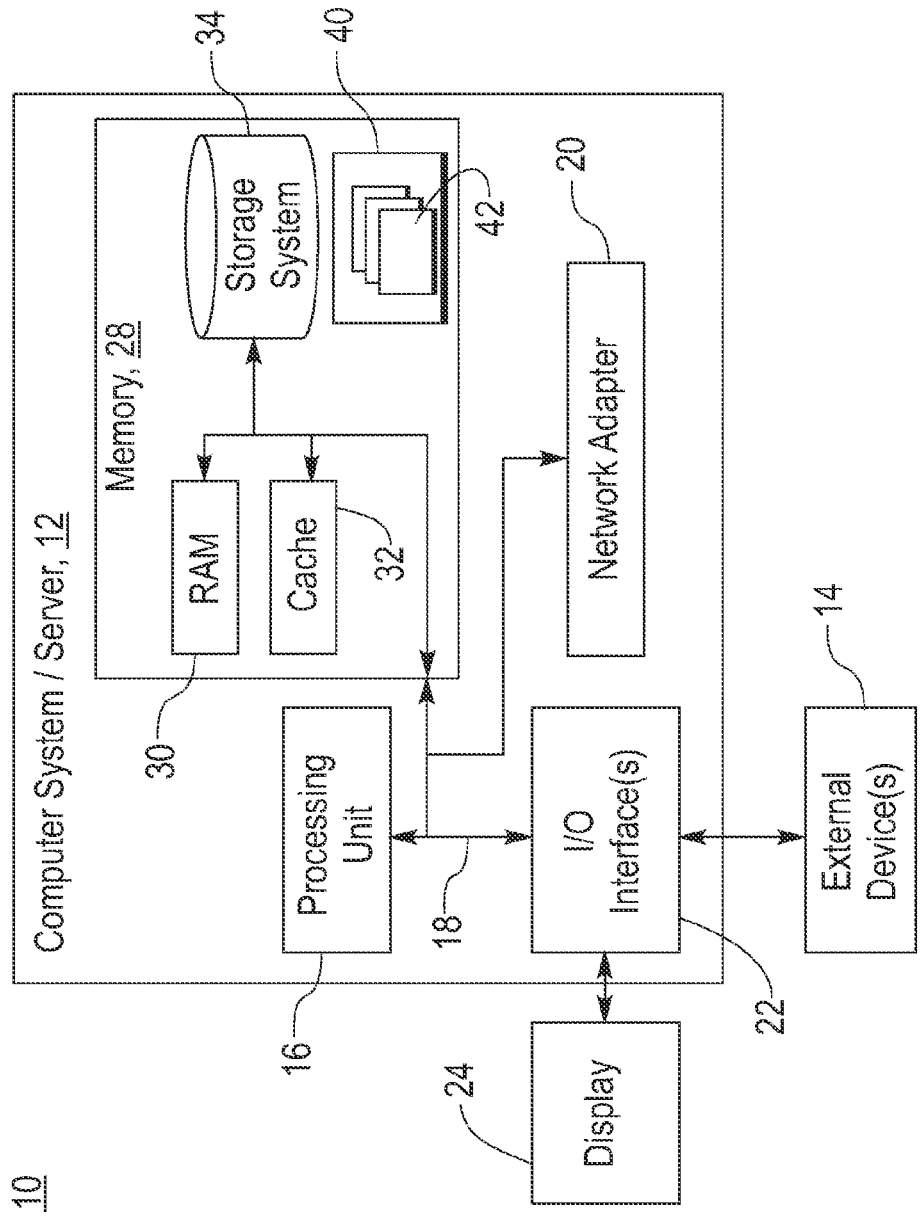
FIG. 1 depicts a cloud computing node according to an embodiment of the present invention.

API consumers looking for API components are often interested in terms of service (for example, contract terms), in addition to the functionality of the API. Some embodiments of the present invention use machine logic based algorithms to help determine and/or prioritize an API's desirability to an end user based, at least in part, on how closely the terms of service meet the end user's "terms of service (ToS) feature" (see definition, below, in the Definitions sub-section of this Detailed Description section) preferences. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
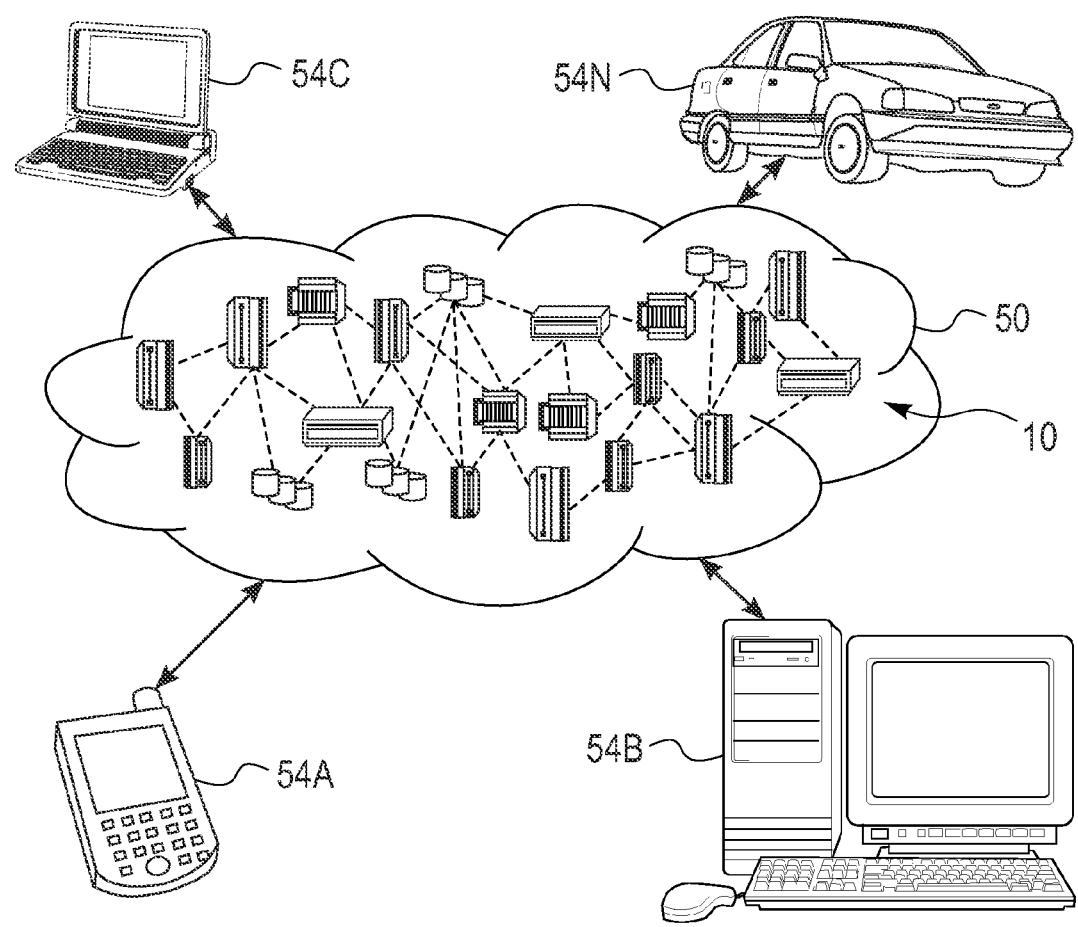
FIG. 2 depicts a cloud computing environment (also referred to as the "first embodiment system") according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
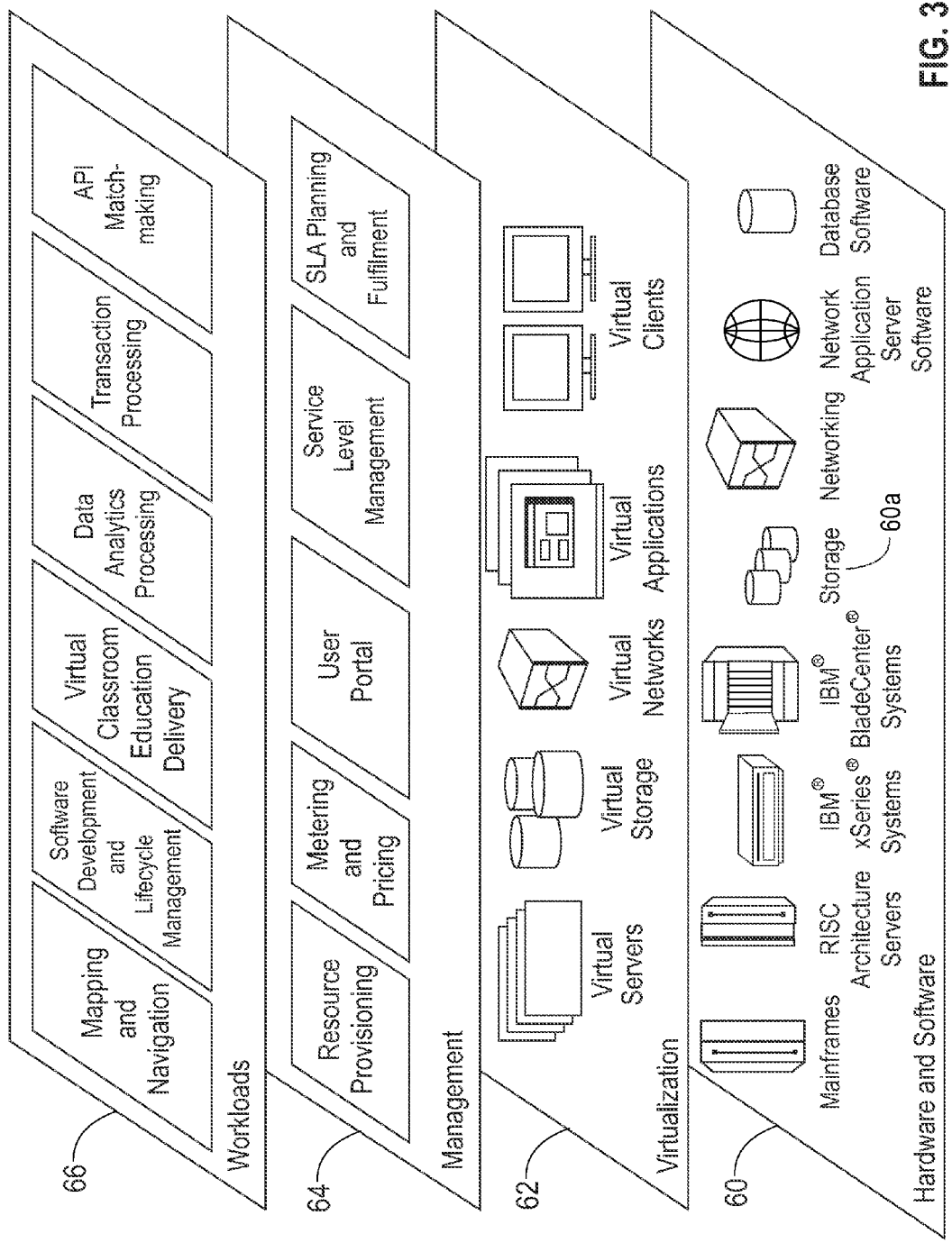
FIG. 3 depicts abstraction model layers according to the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and API matchmaking.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. EXAMPLE EMBODIMENT

Figure 4:
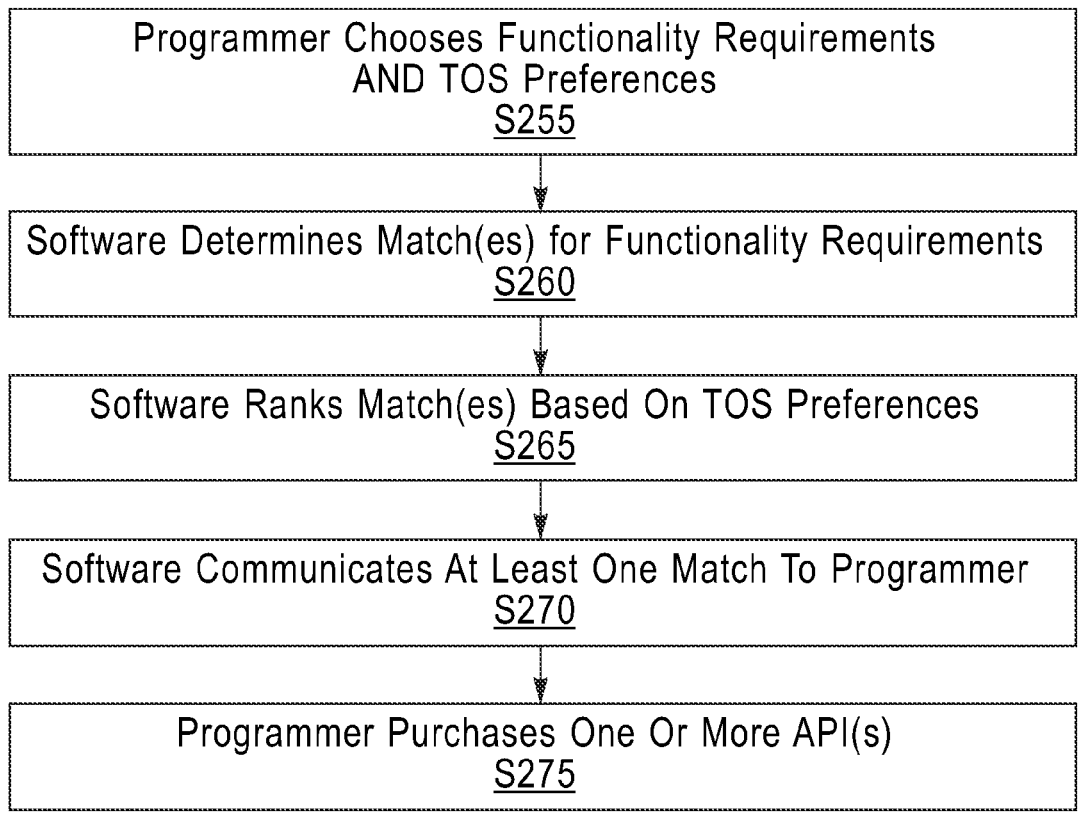
FIG. 4 is a flowchart showing a first embodiment method performed, at least in part, by the first embodiment system.
Figure 5:
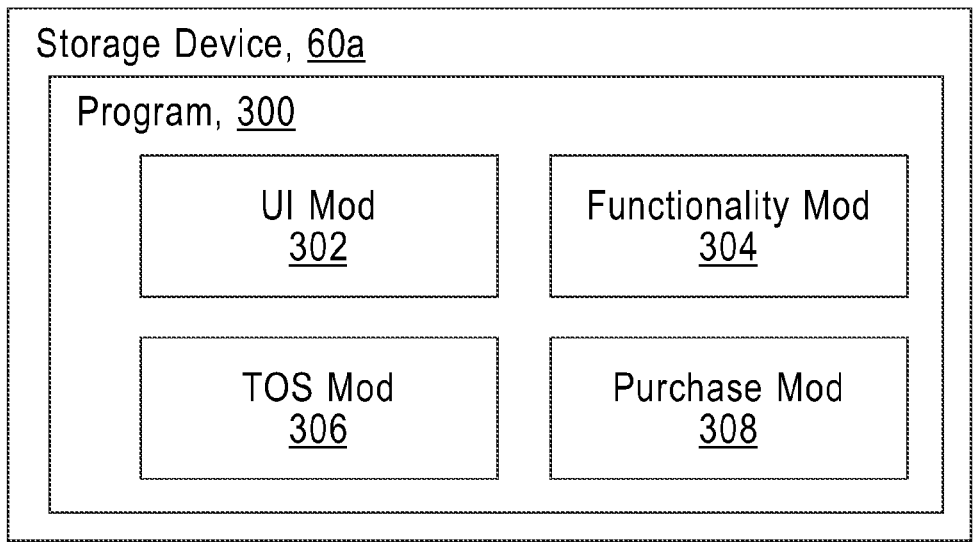
FIG. 5 is a block diagram view of a machine logic (for example, software) portion of the first embodiment system.

FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). As shown in FIG. 5, in this embodiment, program 300 is stored in storage device 60a (see FIG. 3) in a manner less transitory than a signal in transit.

The present embodiment refers extensively to application programming interfaces (APIs) from an API marketplace. For example purposes, this embodiment includes three such APIs: (i) API A, which adds two numbers; (ii) API B, which multiplies two numbers; and (iii) API C, which adds two numbers. In addition to this API functionality, the APIs also include terms of service (ToS) and ToS features, which are discussed in more depth below (individual ToS features may also be referred to as "ToS fields").

Some characteristics of conventional APIs are discussed above in the Background of the Invention section of this Detailed Description. Further, an example of a conventional API is an API that adheres to the constraints of a REST architecture. However, various APIs may be designed for many different machine logic architectures (now known or to be developed in the future). For purposes of the present document, an API may be any digital and/or software service that can be accessed via a computer. Furthermore, as used herein, the term "API" may refer to an API, a set of APIs (including a composite capability that is delivered by more than one API), and/or an API component (that has its own associated ToS). For example, an API may include elements of one or more of the Service Model offerings discussed above in the Hardware And Software Environment sub-section of this Detailed Description, including, for example: (i) Software as a Service; (ii) Platform as a Service; and/or (iii) Infrastructure as a Service. Or, in another embodiment of the present invention, an API may include internet connectivity services provided by an internet service provider and/or any other internet-based service that includes a license.

Processing begins at step S255, where a programmer uses a user interface module (or "mod") 302 (see FIG. 5) to choose the following API options: (i) functionality requirement(s); and (ii) ToS feature preference(s). FIG. 12A shows screenshot 1200a which is part of the user interface for this embodiment, through which the programmer communicates his functional and ToS-related preferences (for example, requirements, desiderata). In the present embodiment, the programmer has a single functionality requirement and two feature preferences. The functionality requirement is that the API must add two numbers. The ToS feature preferences, on the other hand, are characterized in terms of their corresponding ToS features: (i) a commerciality feature, which defines whether ToS allow for commercial or non-commercial use; and (ii) a geographic feature, which defines the geographic region in which the ToS apply and therefore, where the API may be used. In this example embodiment, the programmer's commerciality feature preference is "commercial," and the geographic feature preference is "North American use only."

ToS features may include a wide variety of API characteristics. A list of some known ToS features typically included in legal ToS contracts is provided in the Further Comments and/or Embodiments sub-section of this Detailed Description. However, ToS features may also include features that are not typically included in legal ToS contracts. For example, ToS features may include details about the particular software and/or hardware environment used by the process that an API implements. Or, in another embodiment, ToS features may include dependency related features such as: (i) third-party accounts and/or credentials needed to use the API; (ii) additional APIs that the API is dependent on for operation (or, vice versa: additional APIs that require the API for operation); and/or (iii) any additional hardware and/or software required by the programmer in order to use the API. Furthermore, additional embodiments of the present invention may include one or more of the following ToS features: (i) restrictions on who can use the API; (ii) geographical restrictions on where a user may use the API; (iii) brand permission (and its implications on the consumer); and/or (iv) data privacy aspects of the API. For an even further explanation of ToS features, please see the Definitions sub-section of this Detailed Description.

In some embodiments, two or more APIs may be merged to create a merged set of ToS features representing the ToS features of more than one API. When used herein, merged sets of ToS features may be interchangeable with ToS features such that any discussion of ToS features in this Detailed Description may also refer to merged sets of ToS features.

ToS features and ToS feature preferences (also referred to as "ToS related preferences") may be expressed in a number of ways. In the present embodiment, as stated above, the programmer's commerciality feature preference is "commercial," and the geographic feature preference is "North American use only." However, in other embodiments, ToS features and/or ToS feature preferences may be expressed differently. For example, in one embodiment, the programmer's geographic feature preference (or an API's geographic ToS feature) may be presented as a list of multiple, alternative values, such as the following: (i) North American use; (ii) European use; and/or (iii) Australian use. Or, in another embodiment, a ToS feature and/or a ToS feature preference may be expressed numerically. For example, a permitted users ToS feature (or ToS feature preference) may be expressed by any of the following example descriptions: (i) five; (ii) at least five; (iii) no greater than five; and/or (iv) any odd number.

Referring back to FIG. 4 and the present embodiment, processing proceeds to step S260, where a functionality mod 304 (See FIG. 5) determines one or more matches for the functionality requirement(s). Using the present example, only two APIs match the programmer's functionality requirement of being able to add two numbers: (i) API A; and (ii) API C. Because API B multiplies two numbers instead of adding two numbers, API B is not a match.

Although a simplified example has been provided in the present embodiment, it should be understood that the functionality requirements may include a wide range of possible requirements. For example, in one embodiment, the functionality requirements may be so specific that no matches are found. In such an embodiment, the UI mod 302 may inform the programmer that no matches have been found so that the programmer can revise the functionality requirements.

Alternatively, in another embodiment, the functionality requirements may be very broad such that a large number of potential APIs are returned as matches. In fact, in some embodiments, there may be no functionality requirements at all, such that all APIs from an API marketplace are considered matches for purposes of step S260. Furthermore, matches between API functionality and programmer functionality requirements may be represented by a functionality match value, wherein the functionality match value represents the degree to which the API functionality and the programmer functionality requirements match.

Processing proceeds to step S265, where a ToS mod 306 (See FIG. 5) ranks the functionality match(es) based on the programmer's ToS preferences. In the present embodiment, there are two functionality matches: API A and API C (the features of API A and API C together form a set of API ToS feature information). In the present embodiment, API A includes: (i) a commerciality feature of "commercial"; and (ii) a geographic feature of "North American use only." API C includes: (ii) a commerciality feature of "non-commercial"; and (ii) a geographic feature of "North American use only." Therefore, API A is a one hundred percent (100%) match with the programmer's ToS preferences, as two of two features match. However, because API C includes a non-matching commerciality feature (of "non-commercial"), API C is only a fifty percent (50%) match (as only one of the two features match with the programmer's preferences). In this embodiment, the strength of the respective matches is represented by a ToS match value, where API A's ToS match value is 100% and API C's ToS match value is 50%. Because API A has a higher ToS match value than API C, the ToS mod 306 ranks API A higher than API B.

Processing proceeds to S270, where the UI mod 302 (See FIG. 5) communicates at least one match to the programmer. In the present example, UI mod 302 displays both API A and API C on the programmer's computer screen. FIG. 12B shows screenshot 1200b which is part of the user interface for this embodiment. In this particular embodiment, the user interface 1200b also shows: (i) the corresponding ToS match values for API A and API C; and (ii) API B, with indicators to show that it has been excluded from the list. However, in other embodiments, it is contemplated that the ToS match values may be so low that no match should be presented to the programmer. This may occur, for example, if the ToS match values for all APIs equal zero. In this case, the UI mod 302 may inform the programmer that no matches have been found and allow the programmer to revise the programmer's ToS preferences to increase the chance of finding matches.

Processing proceeds to S275, where the programmer purchases one or more API(s) using a purchase mod 308. In the present embodiment, the programmer purchases API A, as API A fully meets the programmer's functionality requirements and ToS preferences. However, in other examples, the programmer may choose to purchase API C or elect to purchase no APIs at all. Alternatively, in another embodiment, the programmer may be presented with purchase options that allow the programmer to purchase multiple APIs at the same time as part of an API package (at a discount, for example). Or, in yet another embodiment, the APIs may be available under a royalty free open-source license, thereby allowing the programmer to select and use the APIs without having to purchase them at all.

III. FURTHER COMMENTS AND/OR EMBODIMENTS

Some embodiments of the present invention recognize the following facts, potential problems and/or potential areas for improvement with respect to the current state of the art: (i) there is a lack of application programming interface (API) Terms of Service (ToS) standards; (ii) there is a lack of effective, context-based methods to traverse through APIs and generate user-specific views of API collections; (iii) ToS often provide several pricing package and Quality of Service (QoS) variants as part of their usage agreements; (iv) existing methods do not rely on feature models and do not provide means of matchmaking between licenses and a user profile; (v) there are no formal models of API features (for example, legal, technical, etc.); (vi) existing methods consider only the use of APIs, and not their underlying features; (vii) existing methods do not take into account composition of features from multiple APIs, each of which is supplied by a different provider, where each API provides different functionality; (viii) there is no existing concept of profile-driven matching and/or customizations; and/or (ix) existing service description mechanisms focus on describing unique ToS for a single service instead of having variable ToS definitions.

Some embodiments of the present invention may include one, or more, of the following features, characteristics and/or advantages: (i) feature models that are a compact representation of all the products of a software product line; (ii) feature models that provide an expressive mechanism to capture different features and/or aspects of ToS (including, for example, legal terms, QoS, and their alternatives); (iii) feature-based ToS documents that focus on the concept of variability; (iv) providing multiple (valid) ToS for a single service; (v) describing ToS variants in a single artifact (a ToS feature model); (vi) automation advantages; and/or (vii) time-to-value advantages.

Some embodiments of the present invention may include one, or more, of the following additional features, characteristics and/or advantages: (i) providing multi-level structure to ToS documents; (ii) depicting alternatives in ToS provisioning; (iii) using the rich semantics of feature models—including, for example, cross-tree relationships—in contrast to policies; (iv) considering similar vocabulary between ToS; (v) ensuring comparability between ToS; (vi) allowing the automatic selection of APIs with matching ToS variants; (vii) enabling the stating of quantitative information (e.g. risk); (viii) allowing ToS feature models to be used for API(s); and/or (ix) allowing future extensions to be built upon established feature model literature (including, for example, staged configuration approaches and/or collaborative modeling approaches known now or in the future).

In many embodiments of the present invention, a system and method are disclosed to represent API Terms of Service and to select APIs in a marketplace based on consumer ToS requirements. More particularly, disclosed is a method that employs the following: (i) an API marketplace; (ii) an API model; (iii) a feature-based model of ToS for APIs ("ToS feature model"); (iv) a feature-based model of consumer profiles ("consumer feature model"); (v) a means of matchmaking between ToS feature models and consumer feature models, (vi) a means of selecting ToS variants to meet consumer requirements; (vii) an extensible model to allow for industry specific ToS items; and/or (viii) a cost function to compute the opportunity cost for using a specific ToS.

In some embodiments of the present invention, the ToS feature model described in the previous paragraph includes the following categories of ToS features: (i) agreement-related items, such as parties, licenses, and/or changes; (ii) privacy-related items, such as information about privacy, confidentiality, and/or third party interactions; (iii) payment-related items, such as billing modes, billing frequency, and taxes; (iv) legal-related items, such as local restrictions and/or geographical restrictions, including information regarding where the service can be accessed from; (v) technical-related items, such as Internet Protocol, data movement, and/or backups; (vi) support-related items, such as type and cost of support; (vii) termination-related items, such as how to deal with cancelation, suspension, and/or resumption; (viii) glossary and term-related items, such as definition and names of used terms; and/or (ix) notification-related items, such as the medium through which users are informed about changes, such as via email and/or phone.

Referring to the features listed in the above paragraph, FIG. 6A provides an example UI 600*a* for inputting the agreement-related items (listed in (i) above). Similarly, FIG. 6B provides an example UI 600*b* for inputting the payment-related items (listed in (iii) above). Furthermore, FIG. 6C provides an example UI 600*c* for creating, comparing, viewing, and/or updating any of the ToS features discussed above or elsewhere herein.

Figure 7:
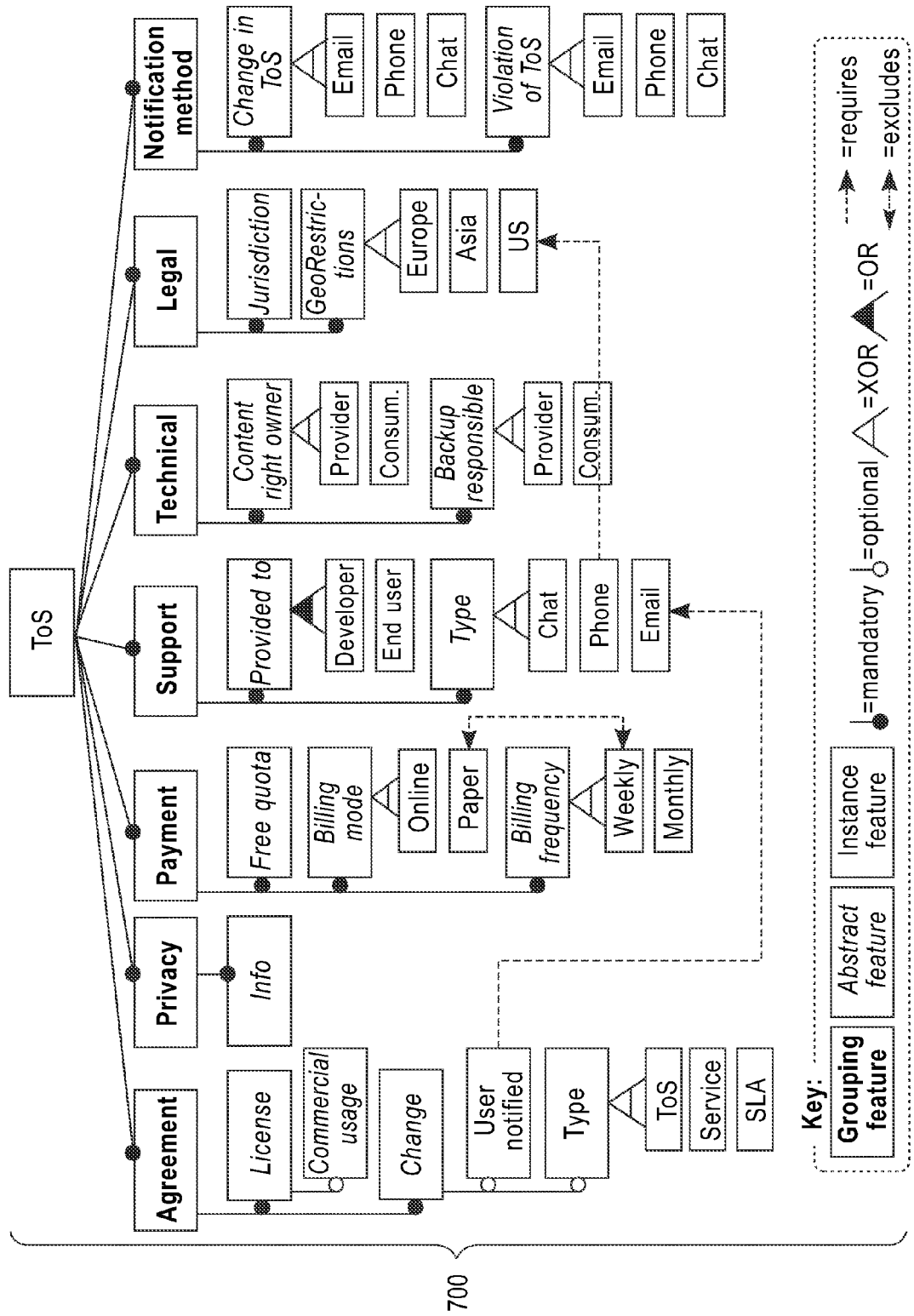
FIG. 7 is a tree diagram view showing information that is helpful in understanding embodiments of the present invention.

In one ToS feature model 700 of the present invention, an API and/or a composition of APIs that offers more than one ToS option is provided (See FIG. 7). This embodiment provides at least some of the following ToS features: (i) alternative payment models (e.g. billing mode and/or billing frequency); (ii) alternative QoS, support, or privacy models depending on the type of account (e.g. free and/or premium accounts); and/or (iii) optional aspects, such as the inclusion of taxes in billing. The ToS feature model 700 of this embodiment allows for the depiction of variability of these options, including the ability to depict inclusive and/or exclusive options. For example, in this embodiment, billing frequency is represented as "monthly 'exclusive or' weekly," which means that the billing frequency must be either monthly or weekly, but not both monthly and weekly.

Referring still to the embodiment shown in FIG. 7, the ToS feature model 700 is used by both API providers and API consumers. API providers state ToS alternatives their API(s) offer, while API consumers state their required ToS alternatives (per ToS feature). The purpose for having providers and consumers use the same ToS feature model is to document and communicate ToS requirements in an agreed-upon format and to perform automated matchmaking between the consumer model(s) and the provider model(s).

Figure 8:
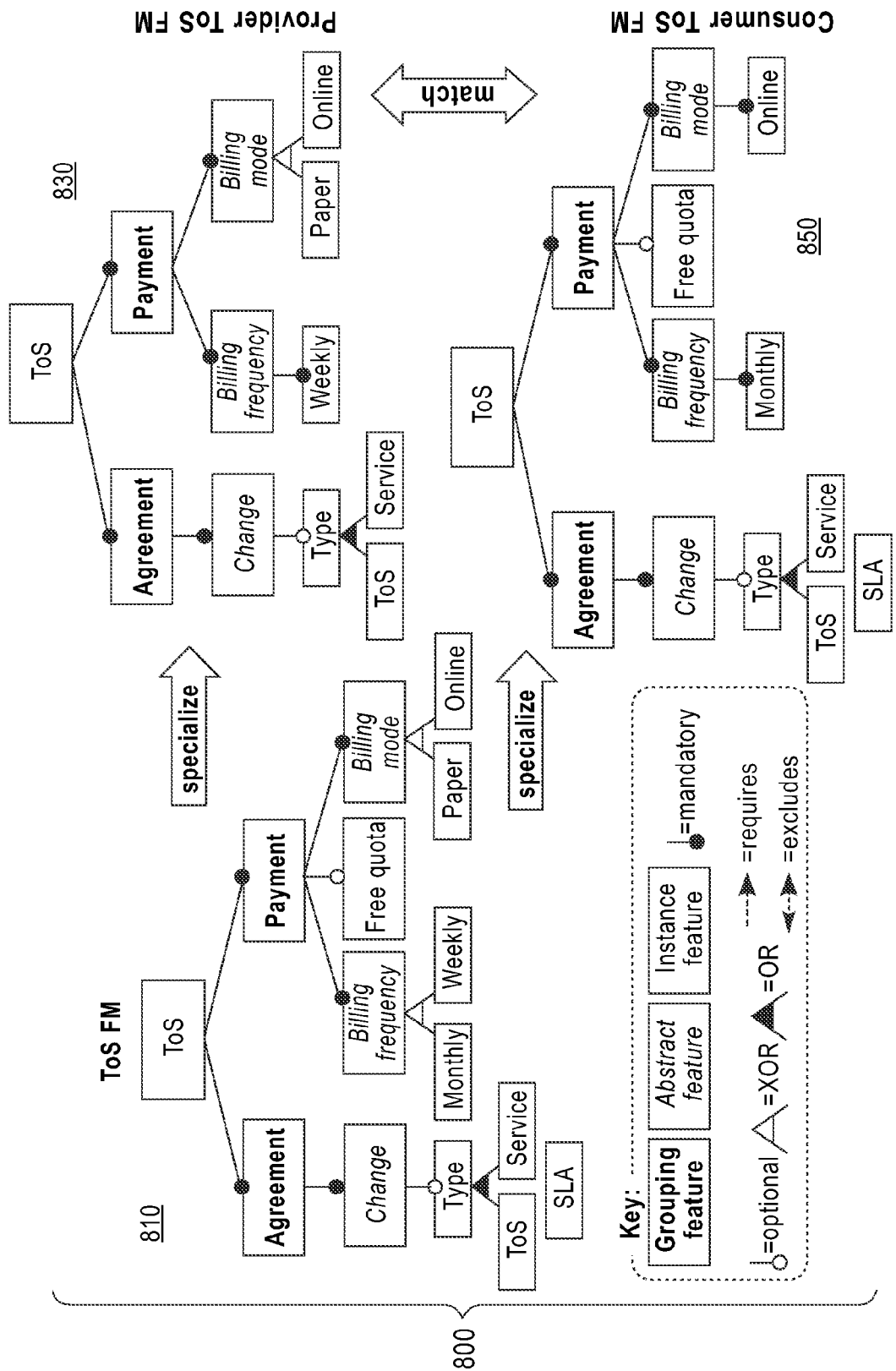
FIG. 8 is a tree diagram view showing information that is helpful in understanding embodiments of the present invention.

In another embodiment of the present invention, three ToS feature models 800 are provided (See FIG. 8). In this embodiment, a generic ToS feature model 810 defines a superset of relevant API ToS features and acts as a blueprint for a provider ToS feature model 830 and a consumer ToS feature model 850. The provider ToS feature model 830: (i) results from instantiating the generic ToS feature model; (ii) represents the specific ToS for one or more APIs; and/or (iii) corresponds to a provider-side policy. Similarly, the consumer ToS feature model 850: (i) results from instantiating the generic ToS feature model; (ii) represents a consumer's required and/or desired ToS aspects; and/or (iii) corresponds to a user profile.

Figure 11A:
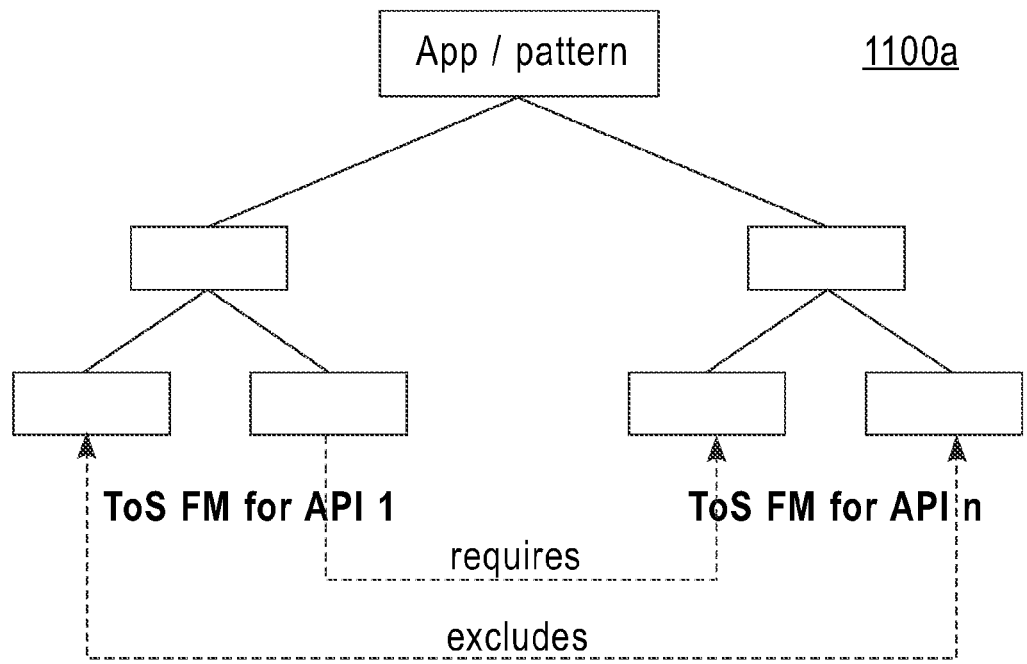
FIG. 11A is a tree diagram view showing information that is helpful in understanding embodiments of the present invention.
Figure 11B:
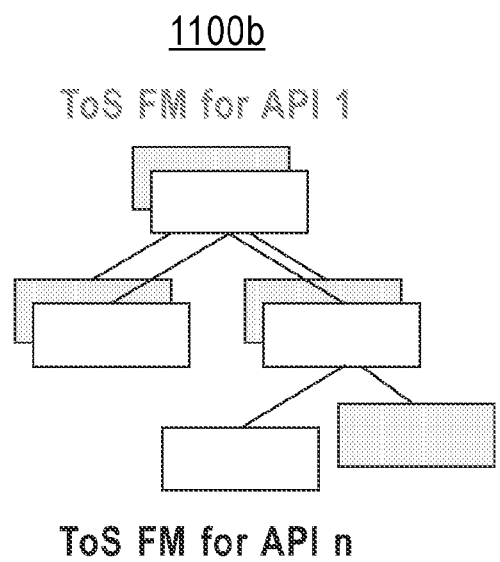
FIG. 11B is a tree diagram view showing information that is helpful in understanding embodiments of the present invention.

In some embodiments of the present invention, multiple provider ToS feature models may be matched with multiple consumer ToS feature models. In these embodiments, the multiple provider ToS feature models may be merged to form a single provider ToS feature model 830, and multiple consumer ToS feature models may be merged to form a single consumer ToS feature model 850 (See FIG. 8). For further discussion of the merging of feature models, see the discussion of FIGS. 11A and 11B, below.

Figure 9:
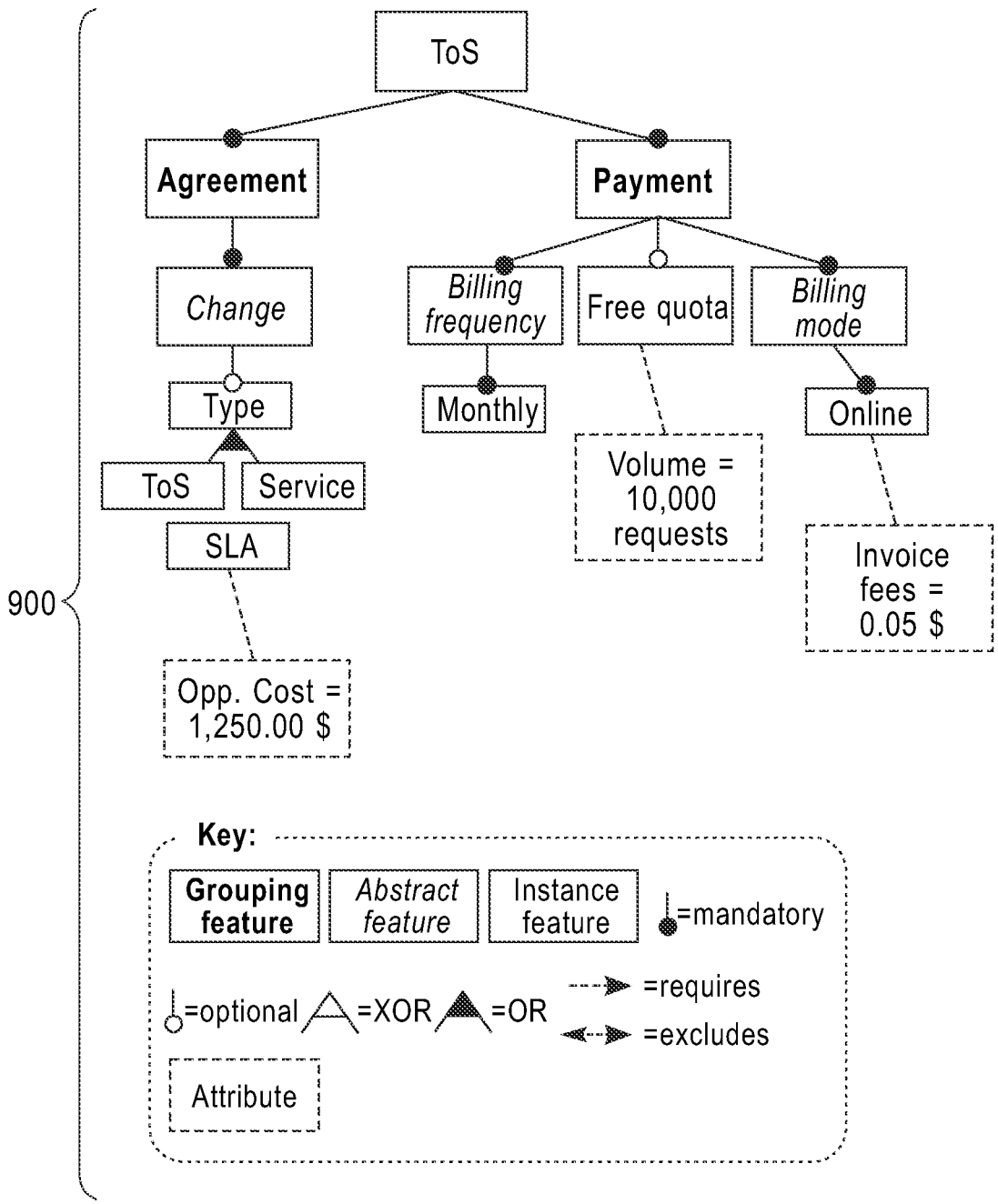
FIG. 9 is a tree diagram view showing information that is helpful in understanding embodiments of the present invention.

In another embodiment of the present invention, a ToS feature model 900 includes quantitative information with numeric attributes (See FIG. 9). In this embodiment, one or more ToS features include numeric attributes to: (i) represent numeric capabilities of ToS features (e.g., the volume of a free quota); (ii) represent numeric requirements for ToS features; and/or (iii) express risks associated with ToS features in terms of opportunity cost (e.g., if a change to service level agreements is part of the ToS, opportunity cost captures the resulting risk). The numeric attributes also provide an approach for variability resolution. The approach includes the following steps: (i) identifying services whose ToS variants match consumer requirements; and/or (ii) selecting ToS variants to minimize or maximize certain numeric attributes.

Figure 10:
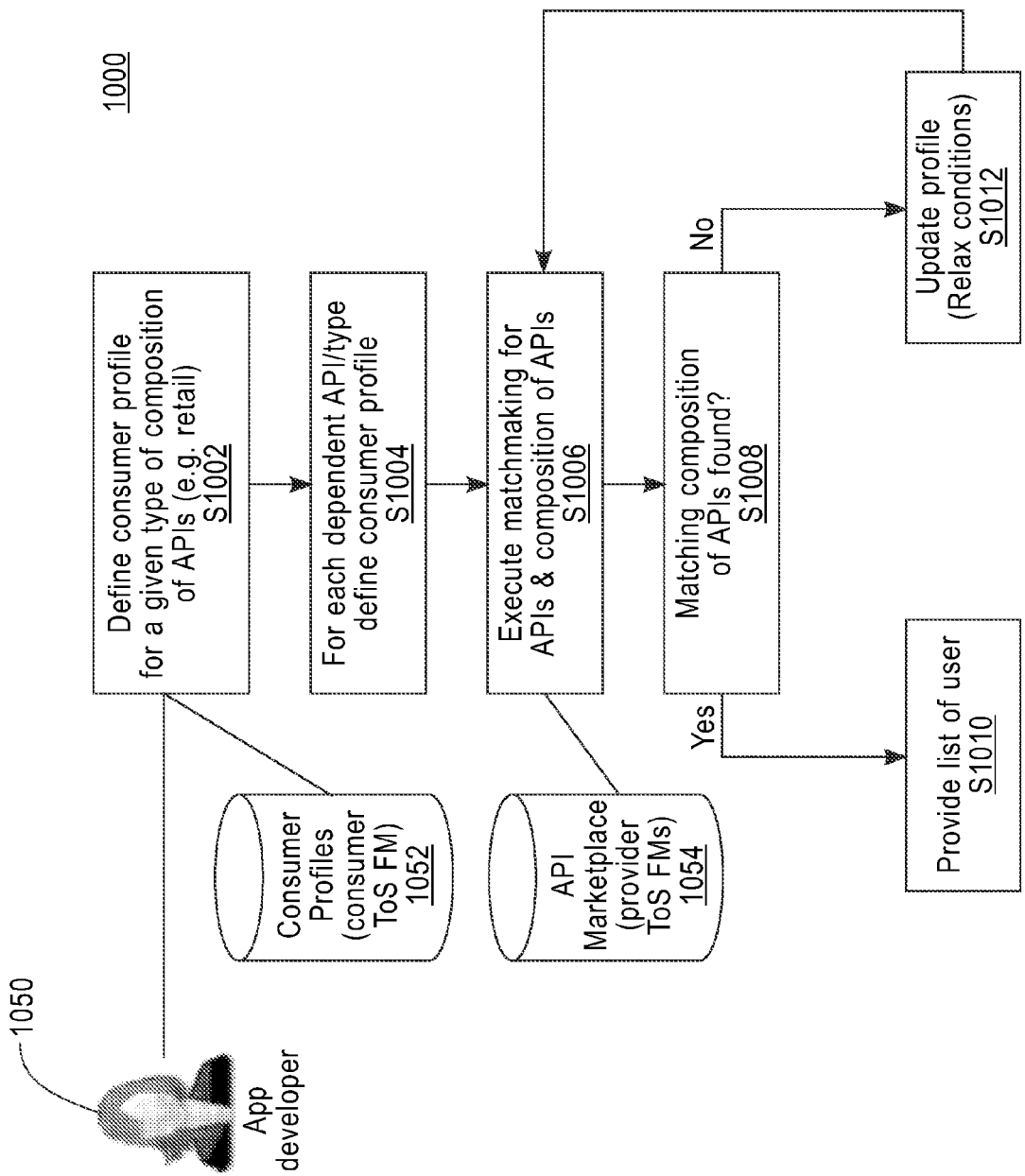
FIG. 10 is a flowchart view of a second embodiment of a method according to the present invention.

Utilizing the above-mentioned feature models of many embodiments of the present invention, method 1000 is adapted to match consumer profiles to applicable API Terms of Service (See FIG. 10). Processing begins at step S1002, where a consumer profile is defined for a given composition of APIs, resulting in the creation of one or more consumer ToS feature models. In the present embodiment, an app developer 1050 has selected a composition of APIs based on a retail environment. One API, for example, allows a user to check-in at a location. Another API allows a merchant to send a promotional offer to a user. Once the consumer profile for this composition of APIs has been defined, it is saved to a consumer profile database 1052, and corresponding consumer ToS feature model(s) are created.

Processing proceeds to step S1004, where additional consumer profiles are defined for each dependent API and/or API type (See FIG. 10), resulting in: (i) the refinement of the existing consumer ToS feature model(s); and/or (ii) the creation of one or more additional consumer ToS feature models. In the present embodiment, for example, a consumer requires a brand limitation (specifically, the consumer requires that a brand not be shared by API providers). Additionally, the consumer requires that the QoS for APIs include 99.9% availability. Both of these requirements are incorporated into the consumer ToS feature model(s).

Referring still to FIG. 10, processing proceeds to step S1006, where provider ToS feature model(s) are retrieved from an API marketplace database 1054, and matchmaking for the API(s) is executed. The strength of the match between the provider ToS feature model(s) and the consumer ToS feature model(s) is represented by a match value. In one embodiment, the match value is binary, representing only whether a match has been found. In other embodiments, however, the match value may represent more than a traditional "yes" or "no" result. For example, in some embodiments, the match value is represented by a percentage indicating the degree to which a provider ToS feature model matches a consumer ToS feature model.

Processing continues to step S1008, where the method 1000 checks whether matching APIs and/or compositions of APIs have been found. If a match is found, processing proceeds to step S1010, where a list of matching APIs is provided to a user. If no match is found, processing proceeds to step S1012, and the consumer profile is updated to relax one or more conditions. For example, in the present embodiment, no match is found, so the brand limitation is removed and the QoS requirement is reduced to 97%. Processing then proceeds back to step S1006. Due to the relaxed conditions, the matching in step S1008 is successful, and processing proceeds to step S1010, where a list of matching APIs is provided to the user.

In some embodiments of the present invention, API feature model(s) are combined to create feature model(s) for compositions of those API(s). A variety of methods may be used to accomplish this. In one embodiment (See FIG. 11A), an aggregate method 1100a is used. In this embodiment, individual ToS feature models are united under a new parent feature, and cross-tree constraints are used to denote dependencies (such as "requires" or "excludes") between ToS features. The advantage to this method lies in the simplicity of the method and the preservation of individual models. In another embodiment of the present invention (See FIG. 11B), a merge method 1100b is used. In this embodiment, new feature model(s) are composed by overlapping features of existing ToS feature models. When possible, features from separate feature models are merged, leading to new combined features in the new feature model. Additional methods of merging feature models include, but are not limited to, the following: (i) defining additional merge criteria and using a machine learning algorithm to improve merge operations over time; and/or (ii) utilizing a human agent to manually merge feature model data.

In an embodiment of the present invention, the merge method 1100b (See FIG. 11B) is used to merge two APIs, API A and API B. In this embodiment, API A includes the following features: (Ai) a commercial license; and (Aii) a billing frequency of monthly "exclusive or" weekly. API B includes the following features: (Bi) a commercial license; and (Bii) a geographic restriction for North American use only. When merged, the resulting API AB includes the following features: (ABi) a commercial license; (ABii) a billing frequency of monthly "exclusive or" weekly; and (ABiii) a geographic restriction for North American use only.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Term-of-Service (ToS) feature: any non-functionality related feature of an API including, but not limited to, features relating to the following subject matter areas: legal, financial, support, geographical, contractual, privacy, confidential, intellectual property terms, and/or change notifications; ToS features do not relate to the functionality of the ToS.

What is claimed is:

1. A computer-implemented method comprising:
receiving, by one or more processors, a set of application programming interface (API) terms-of-service (ToS) feature information that includes identifying information for at least one API and respectively associated ToS features for each identified API;
receiving, by one or more processors, ToS preference information that relates to ToS related preferences for a user, submitted by the user via a user interface; and
evaluating, by one or more processors, a strength of a match between each respective API identified in the API ToS feature information set and the ToS preference information to yield a match value for each API identified in the API ToS feature information set;
wherein:
the respectively associated ToS features do not relate to API functionality;
the ToS related preferences for the user do not include preferences for desired API functionality;
the respectively associated ToS features include at least a first ToS field; and
at least one API identified in the API ToS information set includes multiple, alternative values in its respectively corresponding first ToS field.

2. The computer-implemented method of claim 1, further comprising:
determining, by one or more processors, the at least one API identified in the set of API ToS feature information based upon the strength of a respective functionality match with functionality preferences of a user.

3. The computer-implemented method of claim 1, wherein:
the respectively associated ToS features relate to at least one of the following subject matter areas: legal, financial, support, contractual, privacy, confidential, intellectual property terms, and/or change notifications.

4. The computer-implemented method of claim 1, wherein:
the ToS features of the at least one API identified in the API ToS feature information set are a product of merging the ToS features of two or more APIs.

5. The computer-implemented method of claim 1, wherein:
at least one of the ToS features is represented as a number indicating a value of the respective ToS feature.

6. The computer-implemented method of claim 1, wherein:
the ToS features of each API identified in the API ToS feature information set are represented by ToS feature models, the ToS feature models expressing any requirements, limitations, and/or alternative options for each ToS feature; and
the ToS preference information is represented by one or more consumer feature models, the consumer feature models expressing the user's preferred requirements, limitations, and/or alternative options for each ToS feature.

7. The computer-implemented method of claim 1, wherein:
at least one of the ToS features includes a geographical restriction on where the user may use the ToS feature's respectively associated API.

8. The computer-implemented method of claim 1, wherein:
at least one of the ToS features includes a license under which the ToS feature's respectively associated API is being offered.

9. The computer-implemented method of claim 1, wherein:
at least one of the ToS features includes an amount of technical support provided for the ToS feature's respectively associated API.

10. A computer program product comprising a computer readable storage medium having stored thereon:
first program instructions programmed to receive a set of application programming interface (API) terms-of-service (ToS) feature information that includes identifying information for at least one API and respectively associated ToS features for each identified API;
second program instructions programmed to receive ToS preference information that relates to ToS related preferences for a user, submitted by the user via a user interface; and
third program instructions programmed to evaluate a strength of a match between each respective API identified in the API ToS feature information set and the ToS preference information to yield a match value for each API identified in the API ToS feature information set;
wherein:
the respectively associated ToS features do not relate to API functionality;
the ToS related preferences for the user do not include preferences for desired API functionality;
the respectively associated ToS features include at least a first ToS field; and
at least one API identified in the API ToS information set includes multiple, alternative values in its respectively corresponding first ToS field.

11. The computer program product of claim 10, further comprising:
fourth program instructions programmed to determine the at least one API identified in the set of API ToS feature information based upon the strength of a respective functionality match with functionality preferences of a user.

12. The computer program product of claim 10, wherein:
the respectively associated ToS features relate to at least one of the following subject matter areas: legal, financial, support, contractual, privacy, confidential, intellectual property terms, and/or change notifications.

13. The computer program product of claim 10, wherein:
the ToS features of the at least one API identified in the API ToS feature information set are a product of merging the ToS features of two or more APIs.

14. The computer program product of claim 10, wherein:
at least one of the ToS features is represented as a number indicating a value of the respective ToS feature.

15. The computer program product of claim 10, wherein:
the ToS features of each API identified in the API ToS feature information set are represented by ToS feature models, the ToS feature models expressing any requirements, limitations, and/or alternative options for each ToS feature; and
the ToS preference information is represented by one or more consumer feature models, the consumer feature models expressing the user's preferred requirements, limitations, and/or alternative options for each ToS feature.

16. A computer system comprising:
a processor(s) set; and
a computer readable storage medium;
wherein:
the processor set is structured, located, connected and/or programmed to run program instructions stored on the computer readable storage medium; and
the program instructions include:
first program instructions programmed to receive a set of application programming interface (API) terms-of-service (ToS) feature information that includes identifying information for at least one API and respectively associated ToS features for each identified API;
second program instructions programmed to receive ToS preference information that relates to ToS related preferences for a user, submitted by the user via a user interface; and
third program instructions programmed to evaluate a strength of a match between each respective API identified in the API ToS feature information set and the ToS preference information to yield a match value for each API identified in the API ToS feature information set;
wherein:
the respectively associated ToS features do not relate to API functionality;
the ToS related preferences for the user do not include preferences for desired API functionality;
the respectively associated ToS features include at least a first ToS field; and
at least one API identified in the API ToS information set includes multiple, alternative values in its respectively corresponding first ToS field.

17. The computer system of claim 16, further comprising:
fourth program instructions programmed to determine the at least one API identified in the set of API ToS feature information based upon the strength of a respective functionality match with functionality preferences of a user.

18. The computer system of claim 16, wherein:
the respectively associated ToS features relate to at least one of the following subject matter areas: legal, financial, support, contractual, privacy, confidential, intellectual property terms, and/or change notifications.

19. The computer system of claim 16, wherein:
the ToS features of the at least one API identified in the API ToS feature information set are a product of merging the ToS features of two or more APIs.

20. The computer system of claim 16, wherein:
the ToS features of each API identified in the API ToS feature information set are represented by ToS feature models, the ToS feature models expressing any requirements, limitations, and/or alternative options for each ToS feature; and
the ToS preference information is represented by one or more consumer feature models, the consumer feature models expressing the user's preferred requirements, limitations, and/or alternative options for each ToS feature.

* * * * *